United States Patent
Armerding

(10) Patent No.: US 8,812,616 B2
(45) Date of Patent: Aug. 19, 2014

(54) REMOTE PORT ACCESS (RPA) SERVER

(75) Inventor: Donald G. Armerding, San Diego, CA (US)

(73) Assignee: Systech Corporation, San Diego, CA (US)

(*) Notice: Subject to any disclaimer, the term of this patent is extended or adjusted under 35 U.S.C. 154(b) by 607 days.

(21) Appl. No.: 12/573,041

(22) Filed: Oct. 2, 2009

(65) Prior Publication Data

US 2010/0088396 A1 Apr. 8, 2010

Related U.S. Application Data

(60) Provisional application No. 61/102,742, filed on Oct. 3, 2008.

(51) Int. Cl.
*G06F 15/16* (2006.01)
(52) U.S. Cl.
USPC ............ 709/217; 709/218; 709/219; 709/226
(58) Field of Classification Search
USPC .......................................... 709/217, 218, 219
See application file for complete search history.

(56) References Cited

U.S. PATENT DOCUMENTS

| | | | |
|---|---|---|---|
| 8,082,579 B2* | 12/2011 | Shimizu et al. | 726/12 |
| 2007/0239893 A1* | 10/2007 | Crowe | 709/245 |
| 2007/0294407 A1* | 12/2007 | Owen et al. | 709/226 |
| 2008/0313305 A1* | 12/2008 | Long | 709/217 |
| 2009/0064279 A1* | 3/2009 | Ardolino | 726/3 |
| 2009/0106834 A1* | 4/2009 | Borzycki et al. | 726/21 |
| 2009/0177996 A1* | 7/2009 | Hunt et al. | 715/788 |
| 2010/0057845 A1* | 3/2010 | Thomas et al. | 709/203 |
| 2010/0071020 A1* | 3/2010 | Addington et al. | 725/132 |
| 2011/0208838 A1* | 8/2011 | Thomas et al. | 709/219 |

* cited by examiner

*Primary Examiner* — Djenane Bayard
(74) *Attorney, Agent, or Firm* — Procopio, Cory, Hargreaves & Savitch LLP

(57) ABSTRACT

Systems and methods for accessing data from one or more remote devices and providing data to remote devices installed behind one or more firewalls are provided. The remote devices are configured to automatically detect network connectivity and to open a network connection to a remote port access (RPA) server. The remote devices initiate the connection with the RPA server enabling the connection to be established through the firewall. A client device establishes a network connection to the RPA server in order to access data from or to provide data to one or more of the remote devices. The RPA server acts as an intermediary between the RPA server and the remote devices that receives data from the client device and sends the data to the remote device and receives data from the remote devices and sends the data to the client device.

22 Claims, 5 Drawing Sheets

REMOTE PORT ACCESS (RPA) SERVER

RELATED APPLICATIONS

This application claims the benefit of U.S. Provisional Patent Application Ser. No. 61/102,742, filed Oct. 3, 2008, entitled "REMOTE PORT ACCESS (RPA) SERVER," which is hereby incorporated by reference in its entirety.

FIELD OF THE INVENTION

This invention relates to network communications, in particular to a remote port access server accessible to a remote site and a device server or client.

BACKGROUND

Many network protocols, such as TCP, operate by connecting from a client to a server to gain access to resources on that server. Typically this connection is established over a network such as a local area network (LAN) or a wide area network (WAN). One use of that client-server method is to allow a client device to gain access to an end device, such as a printer, reader, or sensor, via a server (referred to herein as a "remote device") connected the network.

In a simple case, the client might connect directly to the Internet Protocol (IP) address of a remote device and the TCP port on that remote device associated with the end device. However, installing remote devices at locations with Internet access (e.g., a digital subscriber line (DSL) or cable router) so that those devices can communicate with other devices or systems over the Internet can be problematic.

The remote devices typically are installed on a private local network that is connected to the Internet through a firewall. Firewalls are a combination of software and/or hardware that are designed to block unauthorized access to the private local network and the devices connected to the local network. All messages passing into the local network from the Internet or out of the local network from to the Internet pass through the firewall. The firewall examines these messages and blocks those messages that do not meet a predetermined set of security criteria. Typical default firewall configurations allow all outgoing connections and block all incoming connections.

Opening a hole in a network firewall to allow incoming connections to remote devices on the network can be both impractical and undesirable, and requires modifications to the target network and/or the firewall. Making these modifications can be tedious and complex, and the owners of the network may not have sufficient technical knowledge needed to make these modifications.

Connecting to remote devices over the Internet can also be impractical, because the remote devices that are to be reached from the Internet must be assigned a static private IP address. Otherwise, if the remote device is assigned a dynamic IP address, the network address assigned to the remote device may change periodically, preventing connections to the remote device from the Internet unless the device attempting to connect to the remote device is provided the new IP address assigned to the remote device. Static private IP addresses are not typical for a home environment and many business environments, and would usually also require a static public Internet address for the site. Static IP addresses stay the same each time that a device powers up unlike dynamic IP addresses which may change each time the device is powered up.

In a typical home or business environment, IP addresses are typically dynamically allocated using the Dynamic Host Configuration Protocol (DHCP) or a similar technique for dynamically assigning IP addresses to devices on a network. In DHCP, an IP address is temporarily allocated to a device from a pool of IP addresses for a period of time, and after the period of time expires, the IP address is returned to the pool of IP addresses where the IP address may be temporarily allocated to another device. While use of static private IP addresses on the local network is somewhat more likely in a business environment, it is by no means common.

SUMMARY

Systems and methods for accessing data from remote devices and providing data to remote devices installed behind one or more firewalls are provided. The remote devices are configured to automatically detect network connectivity and to open an outgoing network connection to a remote port access (RPA) server. Because the remote devices initiate the outgoing connection with the RPA server from behind the firewall, the firewall allows the connection to be established through the firewall. A client device establishes a network connection to the RPA server allow communications with one or more of the remote devices. The client device can provide data to or request data from the one or more remote devices. The RPA server acts as an intermediary between the RPA server and the remote devices that receives data from the client device and sends the data to the remote device and receives data from the remote devices and sends the data to the client device. When a client device requests data from a remote device, the RPA server receives the request for data from the client device and requests data identified in the request from the remote device. The RPA server requests the data from the remote device or devices using the network connections through the firewall or firewalls that were established by the client devices. When a client device sends data to a remote device or remote devices, the client device sends the data to the RPA server, which then sends the data to the remote device or remote devices via the network connections through the firewall or firewalls that were established by the client devices.

According to an embodiment, a method for accessing data from a remote device is provided. The method includes receiving a connection request from a remote device that is located behind a firewall. The method also includes establishing a first network connection with the remote device through the firewall. The method also includes receiving a connection request from a client device, and establishing a second network connection with the client device. The method also includes receiving a request for data from the remote device from the client device through the second network connection. The method further includes requesting the data from the remote device via the first network connection, receiving the requested data from the remote device via the first network connection, and providing the requested data to the client via the second network connection.

According to an embodiment, a system is provided that includes a remote port access server. The remote port access server is configured to listen for connection requests from a remote device on a first set of predetermined ports, the remote device being located behind a firewall. The remote port access server is also configured to establish a first network connection with a remote device through the firewall in response to a connection request from the remote device. The remote port access server is also configured to listen for connection requests from a client device on a second set of predetermined ports, the client device being located outside of the firewall, establish a second network connection with the client device in response to receiving a connection request from the client device, receive a data request from the client device for data from the remote device, request from the remote device the data requested in the data request, receive the requested data from the remote device, and transmit the requested data received from the remote device to the client via the second network connection.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems and methods for communicating with remote devices installed behind one or more firewalls are provided. The remote devices are "plug-and-play" devices that automatically detect network connectivity when installed on a local network by an end user. Each remote device automatically opens a network connection (e.g., a TCP connection) to a remote port access (RPA) server, and because the remote device initiates the network connection, the firewall allows the network connection to be established without requiring the firewall to be reconfigured by the end user. The RPA server is then able to communicate with the remote devices through the network connections to the remote devices.

A client device may establish a network connection with the RPA server in order to communicate with the one or more remote devices. The client device is located outside of the firewall or firewalls behind which the remote devices are installed, and thus would not be able to directly connect with each of the remote devices without a hole being opened in the firewall. Instead, the client device connects to the RPA server and request data from one or more remote devices connected to the RPA server. The RPA server then retrieves the requested data from the one or more remote devices using the network connections with the remote devices through the firewall or firewalls.

According to some embodiments, a "remote port access" service (RPA service) is a computer executable program (e.g., a software module) or process that runs on a server computer system that is accessible from the Internet from both the remote devices located behind a firewall or firewalls, and from the client device located outside of the firewall or firewalls. The RPA server is configured to listen to connection requests from remote devices on a first port or set of ports and to listen for connection requests from client devices on a second port or set of ports.

According to an embodiment, the RPA server may be implemented using a computer system running the MICROSOFT WINDOWS operating system and the Internet Information Services (IIS) for the WINDOWS operating system. According to some embodiments, the RPA server may be implemented WINDOWS XP (Professional) or the WINDOWS VISTA (Business). Some embodiments are also implemented on the WINDOWS SERVER 2003 operating system. Some embodiments are also be implemented on WINDOWS SERVER 2008, LINUX, or other operating systems.

Figure 1:
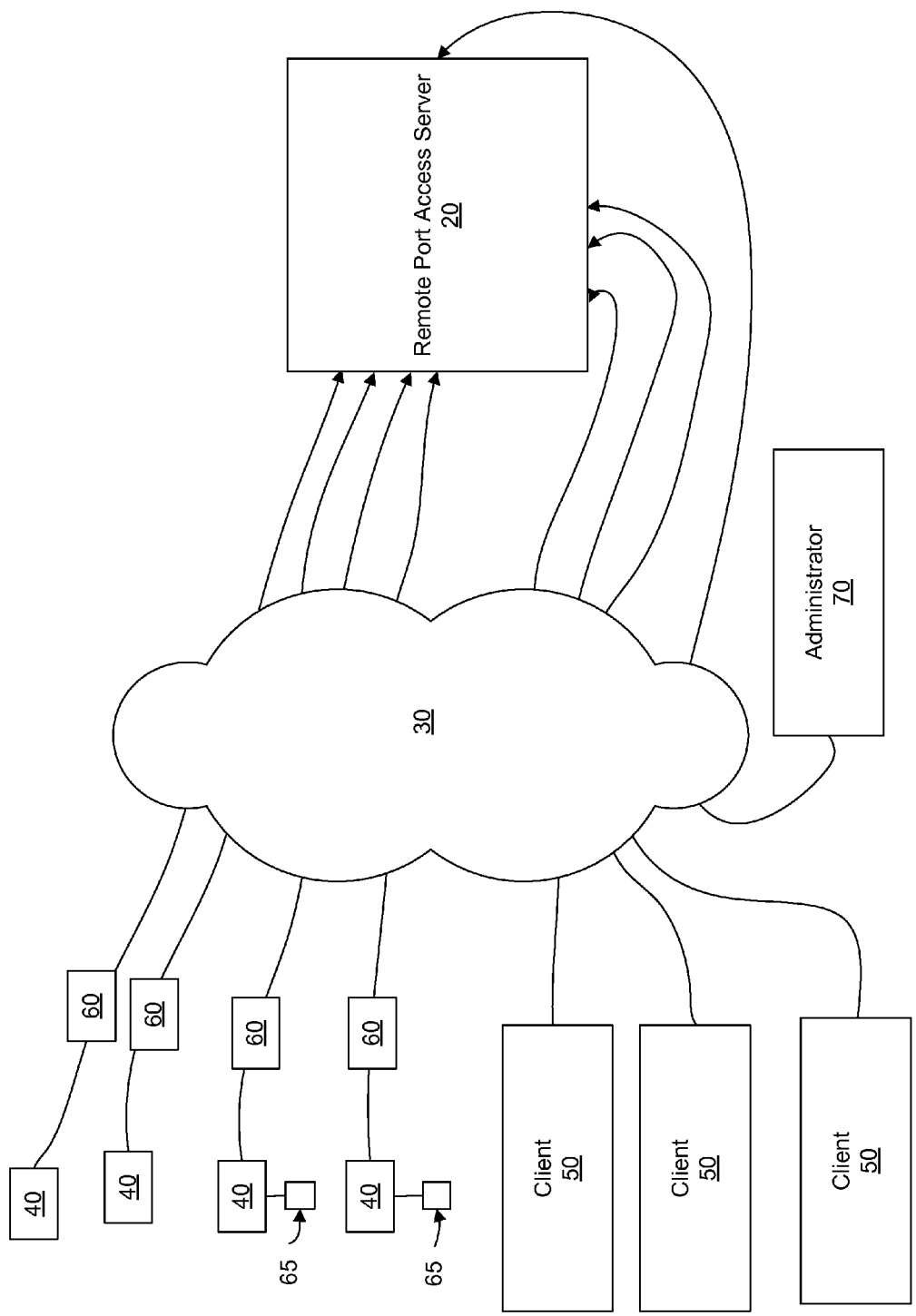
FIG. 1 illustrates one example of a remote port access server in communication with a remote device and a client according to an embodiment.

Turning now to FIG. 1, additional details of the system will be described. The system includes a remote port access server 20 in communication with one or more remote devices 40 and one or more device servers 50 (client devices). The RPA service runs on a host such as the remote port access server 20 (RPA server) which is accessible over a network or combination of networks 30, such as the Internet. The RPA server can be accessed from and communicate with both the one or more remote devices 40 and the one or more clients 50.

According to some embodiments, client device 50 is a computer system comprising a processor, a network interface card, and memory. The network interface card may provide a wired or wireless connection to the RPA server 50 through the over a network or combination of networks 30. The memory includes executable software programs that may be run on the client device. According to some embodiments, the client device comprises a personal computer system or laptop computer system. According to other embodiments, the client device comprises a mobile device, such as a mobile phone or handheld computer system. According to some embodiments, the client device 50 may include web browser software that enables the client device 50 to access a web-based interface provided by RPA server 50.

Each remote device 40 is coupled to a local network 60 with Internet access or is directly coupled to such a device which provides Internet access (e.g., a cable or DSL router). Each local network may have a firewall or other security system. Each remote device 40 can be coupled to one or more end devices 65 (e.g., coupled to an appropriate port on the remote device) to provide communication between the end device 65 and a client 50 via the RPA server 20. According to an embodiment, each remote device 40 may include one or more ports to which an end device 65 may be coupled. For example, remote device 40 may include one or more serial ports, telephony ports, Universal Serial Bus (USB) ports, and/or other input-output ports. Alternatively, the end device 65 can be incorporated into the remote device. The end device can be a sensor or any other kind of device which a client may wish to communicate. In one embodiment, the device described in U.S. application Ser. No. 10/993,226 titled Modular Communication Server, filed Nov. 19, 2004 (hereby incorporated by reference) is modified according to the teachings herein to function as the remote device 40. According to an embodiment, the end device 65 may comprise a sensing device (e.g., for taking temperature readings, a motion sensor, a monitor for fluid levels or gas pressure in a storage container, etc.), a printer, a scanner, card reader, a point of sale terminal (e.g., a cash register or kiosk), or other device from which a client may wish to gather data remotely and/or to provide data to the remote device. For example, one or more motion sensors, cameras, and/or card readers may be installed in a security facility and a client can remotely monitor access to the facility remotely by accessing data generated by the motion sensors, cameras, and/or card readers. A client can send data to end devices 65 coupled to a remote device 40. Returning now to the example of the secure facility with the one or more card readers, the client can send updated access information to a door access controller that identifies which access cards can be used to open doors to the secure facility.

For each deployed remote device 40, the RPA server 20 listens on two sets of one or more ports. On one set of ports the RPA server 20 listens for a connection request from the remote device 40 and on another set of ports the RPA server 20 listens for a connection request from a client device 50. Upon installation, the remote device 40 can automatically initiate a connection (e.g., a TCP connection) with the RPA server 20 and waits for communication. To access a given remote device 40 (and the associated end device 65, if any), the client 50 connects to the RPA server 20. The RPA server 20 then passes communications between the remote device 40 and the client 50.

According to an embodiment, there are a large number of remote devices 40, but a relatively small number of client devices 50 that may connect to the remote device 40. For example, the remote devices 40 can be located in retail stores and/or service stations. The remote devices 40 can, for example, be coupled to one or more end devices 65 used to track levels of inventory in a retail store or to track the sales of fuel at a service station and the levels of fuel remaining in the service station's storage tanks. According to some embodiments, client device 50 connects to remote device 40 periodically and one at a time via RPA server 20. According to other embodiments, the client device 50 may connect with multiple remote devices 40 simultaneously.

According to an embodiment, RPA server 20 provides an administrative interface that allows clients to select which of many remote devices to connect to via the RPA server 20. According to an embodiment, the administrative interface also enables the client to select one or more end devices 65 coupled to remote devices 40 to which the client would like to connect. According to some embodiments, the administrative interface is implemented as a web page that is served by a web server included in or interfaced with RPA server 20. According to some embodiments, the RPA server 20 includes a secure Hypertext Transfer Protocol over Secure Socket Layer (HTTPS) interface for serving secure web pages to the client device 50.

According to an embodiment, the administrative interface may include a sub-user creation interface that enables a client to create one or more sub-users that have access to only a selected portion of remote devices 40 and/or end devices 65.

The embodiments described herein require no modifications to be a made to the local network to which a remote device 40 is connected. The remote device 40 is not required to be assigned a static IP address on the local network 60. Instead, remote device 40 may be allocated a dynamic IP address on the local network 60 using DHCP or a similar protocol for allocating dynamic IP addresses. The network address translation (NAT) and firewall for the local network do not need to be modified to accommodate the network connection between the remote device 40 and the RPA server 20.

The solution provides a "plug-n-play" installation of one or more remote devices 40 on a local network 60. Both the client 50 and the remote device 40 can be pre-configured to contact the RPA server 20 upon initialization. Many types of end devices can be attached to ports (e.g., serial ports and USB ports) on the remote device thereby making those end devices accessible over the Internet 30. The end-user (via a client 50) only has to connect the remote device 40 to their local network 60 with Internet access (e.g., a cable or DSL router) and attach the end device to the appropriate port on the remote device. According to an embodiment, the remote device 40 may connect to the RPA server 20 using a secure communications protocol, such as Transport Layer Security (TLS) or Secure Socket Layer (SSL), which is the predecessor to TLS.

Figure 2:
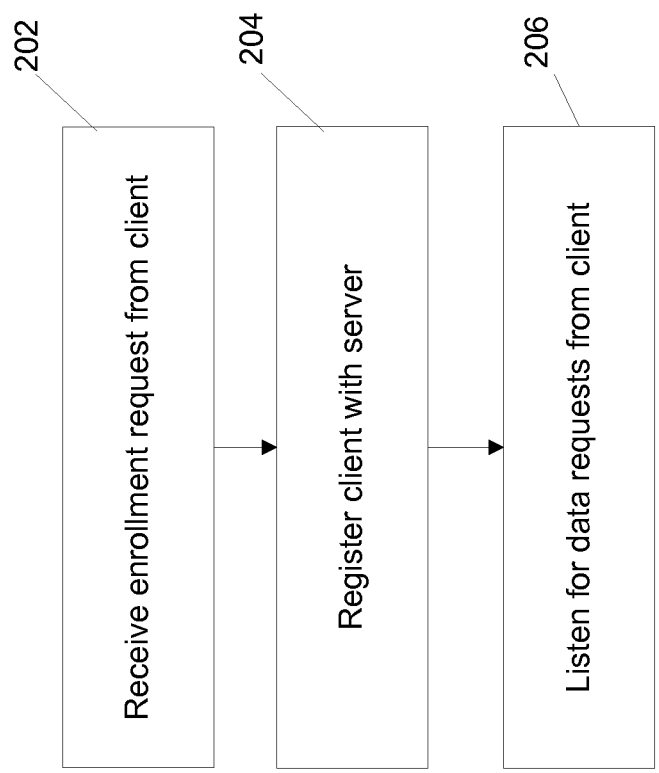
FIG. 2 is a high level flow diagram of a process for registering a client with a remote port access server according to an embodiment.

FIG. 2 is a high level flow diagram of a process 200 for registering a client with a remote port access server according to an embodiment. Process 200 begins with the RPA server receiving an enrollment request from a client device 50 (step 202). As described above, a client device 40 may be configured to automatically contact RPA server 20 when the client device 50 is connected to a network connection.

A client registers with the RPA server in order to claim one or more remote devices 40 from which the client may request data through the RPA server 20. According to an embodiment, the RPA server maintains a client data store that includes the IP address and/or other information for registered client devices. The RPA server registers the client by adding a unique identifier for the client to the client data store (step 204). Once the client device 50 has been registered with the RPA server 20, the RPA server 20 listens for connection request from the client device 50 (and any other registered client devices) on a predetermined port or set of ports.

According to some embodiments, communications between the RPA server 20 and the client devices 50 may be encrypted using a secure communications protocol, such as TLS or SSL, to prevent eavesdropping, tampering, and message forgery. The use of a secure communications protocol provides: (1) authentication, (2) encryption, and (3) data integrity. By using a secure communications protocol, the client device 50 can ensure that the RPA server 20 with which the client device 50 is communicating is actually an RPA server 20 and not a server operated by a malicious third party masquerading as an RPA server 20. Similarly, the RPA server 20 is able to ensure that the client device 50 with which the RPA server is communicating is actually a client device 50 and not a non-client device operated by a malicious third party. By encrypting the data being transmitted between the RPA server 20 and the client device 50, the contents of the data are hidden, preventing a third party from monitoring data communications between the RPA server 20 and the client device 20 in order to obtain the data. The secure communications protocol also provides data integrity. A malicious third party could not alter the data being communicated between the RPA server 20 and client device 50 without the tampering being detected.

According to some embodiments, after registering the client with the server, the RPA server 20 generates a set of encryption keys for the client device 50, including a public key and a private key. The private key provides (1) secure communications between the client device and the RPA server 20 and (2) authentication. The private key should only be known to the client device 50 and the RPA server 20, while the public key may be shared with anyone who wishes to encrypt and send data to the client device 50. The data encrypted using the public key may only be decrypted by using the corresponding private key issued to the client device 50.

In the present embodiment, the RPA server 20 encrypts data sent to the client device 50 using the public key of the client device 50. When the client device 50 receives the encrypted data, the client device 50 decrypts the data using the private key for the client device 50. Even if there data sent to the client device 20 were intercepted by a malicious third party, the encrypted data should not be able to be decrypted by the malicious third party without the private key associated with the client device 50.

Data communications from the client device 50 to the RPA server 20 may also be similarly encrypted by client device 50 using a public key of the RPA server 20. Even if a malicious third party were to intercept data send from the client device 50 to the RPA server 20, the malicious third party should not be able to decrypt the data without the private key of the RPA server 20.

In the present embodiment, the RPA server 20 can also use the certificate to authenticate the identity of the client device 20. For example, the RPA server 20 may present a challenge-response test to the client device 50 by sending the client a message encrypted using the client's public key and requiring the client device 50 to return either a decrypted copy of the same message or a specified response to the message to the RPA server 20 to ensure that the client device 50 has the client device's private key. If a malicious third party attempts to spoof the RPA server by pretending to be an authorized client, the malicious third party should not be able to decrypt the encrypted challenge-response message sent by the RPA server 20 without having the private key of the client device 50. If the RPA server 20 does not receive the expected response to the challenge, the RPA server 20 will not establish a connection with the client device 50.

In the present embodiment, RPA server 20 also provides copy of the encryption keys to the client device 50. According to some embodiments, the private key may be provided to the client at the end of an online enrollment process. For example, in some embodiments the RPA server 20 provides a web page interface for the client to enter the enrollment request information using Hypertext Transfer Protocol Secure (HTTPS) or another secure communications protocol. After the client has entered the enrollment request information and the RPA server 20 has generated the private key for the client, the RPA server may provide a link or Uniform Resource Locator (URL) to the client for downloading the encryption keys to client device 50. According to other embodiments, the encryption keys may be provided to the client via offline methods, such as mailing a password protected computer readable medium to the client from which the client can copy the encryption keys to the client device 50. Once the client device 50 has been registered with the RPA server 20, the client device may connect to one or more remote devices 40 and/or end devices 65 via the RPA server.

Figure 3:
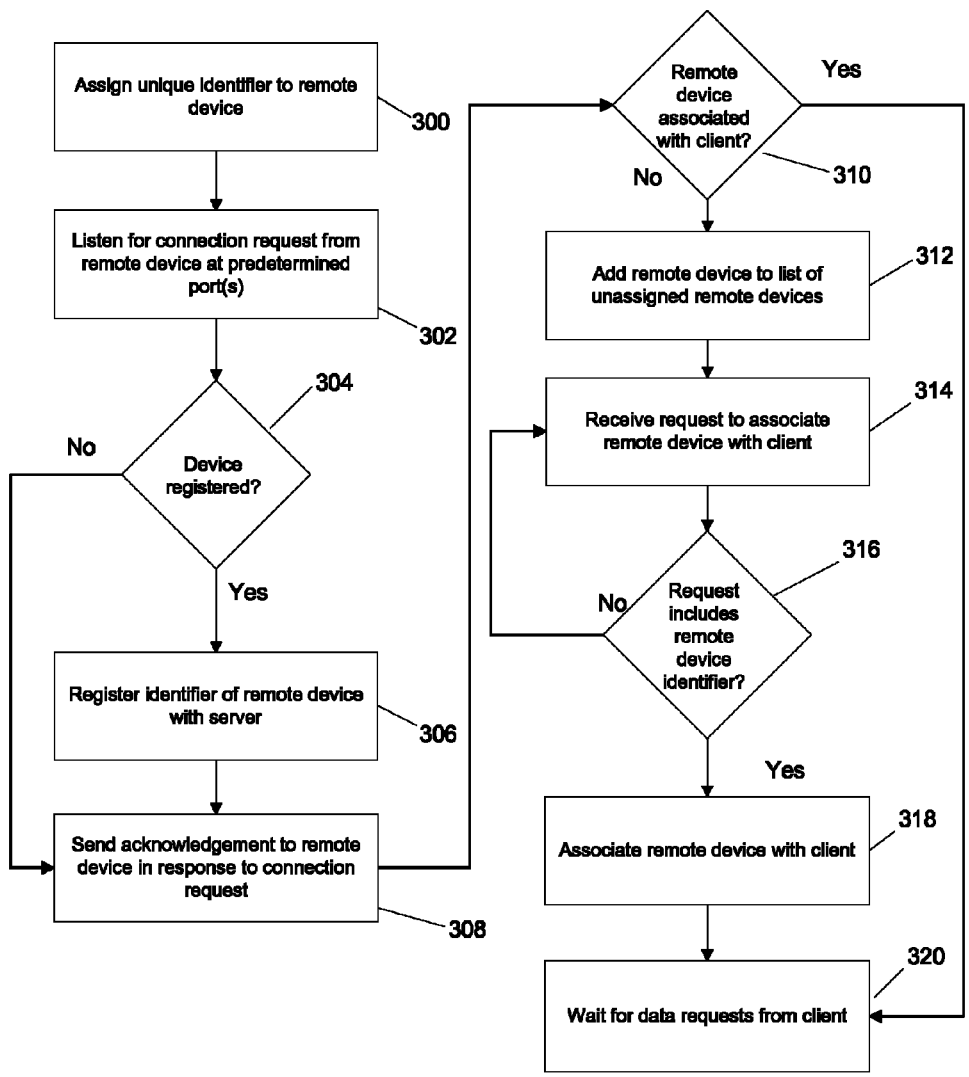
FIG. 3 is a high level flow diagram of a process for registering a remote device with a remote port access server according to an embodiment.

FIG. 3 is a high level flow diagram of a process for registering a remote device with a remote port access server according to an embodiment. A firewall of local network 60 separates the remote device 40 from the remote port access server 20 and the client device 50. Client device 50 cannot directly create a TCP connection with remote device 40 because the firewall of local network 60 would block the TCP connection requests. The firewall would need to be modified to allow devices outside of the firewall to send a TCP connection request to the remote devices behind the firewall. However, the firewall allows the remote device 40 to establish connections with devices outside of the firewall. Therefore, the remote device can connect with RPA server 20, and RPA server 20 can act as intermediary between the client device 50 and the remote device 40.

Before remote device 40 is provided to an end user (e.g., at the time that the remote device is manufactured), the remote device 40 is assigned a unique serial number that distinguishes the device from the all other remote devices 40 (step 300). According to some embodiments, the unique serial number assigned to the device is registered with the RPA server 20 at the time before the device is issued to a client for installation on a network. According to some embodiments, the Media Access Control (MAC) address of the device is also registered with the RPA server 20. The MAC address is a unique identifier that is assigned to most network adaptors or network interface cards (NICs) by the manufacturer of the network adaptor or network interface card. The MAC address can be used to uniquely identify the adaptor or interface card. According to an embodiment, the RPA server 20 includes a data store, such as a relational database, that includes information identifying all of the remote devices 40 that have been manufactured. According to some embodiments, the data store may also include information that identifies whether each device has been deployed or installed on a network and whether the remote device 40 has been associated with the a client device 50.

After registering the remote device 40 with the RPA server 20, the RPA server 20 listens for connection requests from the remote device 40 on a predetermined port number or set of port numbers (step 302). According to an embodiment, a plurality of remote devices 40 may attempt to connect to the predetermined port on the RPA server 20. According to some embodiments, a connection request from a remote device 40 may include the unique identifier associated with the remote device 40. According some embodiments, the connection request may also include the MAC address of network adaptor card of the device.

Once the remote device 40 is installed behind firewall 60, the remote device 40 automatically attempts to establish a network connection with RPA server 20. According to some embodiments, the remote device 40 attempts to establish a TCP connection with RPA server 20 through firewall 60. According to other embodiments, other connection protocols may be used. In some embodiments, a persistent network connection is established between the remote device 40 and the RPA server 20, while in other embodiments, an intermittent network connection is established between the remote device 40 and the RPA server 20.

If a connection request is received from a remote device 40 by RPA server 20 on a predetermined port number, the RPA server 20 makes a determination whether the remote device 40 is registered with the RPA server 20 (step 304). As described above, a unique identifier is assigned to each remote device 40 before the remote device 40 is provided to the end user. According to some embodiments, this unique identifier may be registered with the RPA server 20 before the remote device is provided to a client for installation on a local network 60 behind a firewall. The connection requests sent to the RPA server 20 should include the unique identifier and/or the MAC address of the NIC included in the remote device 40. If the RPA server 20 receives a request that includes a unique identifier that does not match that of a registered remote device, the remote device is registered with the RPA server 20 (step 306).

The RPA server 20 sends an acknowledgment to the remote device 40 indicating that the RPA server would like to establish a network connection with the remote device 40 in response to the connection request received from the remote device (step 308). According to an embodiment, the network connection is a TCP connection between the RPA server 20 and the remote device 40. According to some embodiments, a secure communications protocol may be used for communications between the RPA server 20 and the remote device 40, such as SSL. Once the network connection is established with the remote device 40, the RPA server 20 may send data to the remote device 40 or request data from the remote device 40 on behalf of a client.

The RPA server 20 then makes a determination whether the remote device 40 is associated with a client 50 (step 310). According to some embodiments, a remote device 40 may have been associated with a particular client before the device was provided to the client for installation behind the firewall.

For example, a client that owns a dozen service stations purchases a remote device 40 for installation on a local network 60 of each service station. Each remote device 40 has at least one end device 65 coupled to ports on the local device, the end devices 65 including sensors that monitor an amount of fuel sold at each service station and the remaining amount of fuel stored at each service station. At the time that the client purchases the remote device 40, an account is established on the RPA server that enrolls the client on the server and the unique identifiers of the remote devices 40 purchased by the client are associated with the client. Because the remote devices 40 have been associated with the client, the client may later access data from these remote devices 40 via the RPA server.

According to other embodiments, a remote device 40 may be deployed at a client site before being associated with a client. A client can access the RPA server 20 via a client device 50 to claim the remote device 40. If the remote device has not yet been associated with a client, RPA server 20 adds the remote device to a list or data store for tracking unassigned remote devices (step 312). According to an embodiment, RPA server provides a remote device registration interface, such as a web page or web pages, that enables a client to log on to the RPA server to claim remote devices (step 314). The remote device registration interface prompts the client to enter the unique identifiers associated with one or more remote devices 40 in order to register the remote devices with the client (step 316). According to some embodiments, the client may also enter the MAC address of the network interface card of the remote device into the remote device registration interface in order to claim a remote device. If a user attempts to register a remote device that is on the list of remote devices, the remote device is associated with the client (step 318). If a client enters an invalid device identifier the RPA server 20 ignores the request. If a client enters a valid but already registered device identifier, the RPA server 20 display an error message to the user indicating that the remote device is already associated with another client. According to some embodiments, the error message may instruct the user to call a customer support center to speak with a customer support representative to resolve a conflict where a remote device 40 is already registered with another client.

According yet another embodiment, a client may claim a remote device by telephone. For example, the RPA server 20 may interface with an automated telephone system that enables a user to speak or enter the unique identifier or MAC address of a remote device in order to claim the remote device. The automated system may prompt the client say or input a client id and/or password to verify the identity of the client. According to some embodiments, a client calls a customer support center manned by live operators that collect information to verify the identity of the client and the unique identifier or MAC address of a remote device or remote devices to be associated with the client. The RPA server 20 may be provide a user interface in the form of a web page that enables the operators at the customer support center to register remote devices with the client.

Once a network connection has been established with a remote device 40, and the client has been associated with the client, the RPA server 20 waits for data requests from a client device 50 to retrieve data from the remote device 40 or to transmit data from the client device 50 to the remote device 40.

According to some embodiments, communications between the RPA server and the remote device 40 may be encrypted using a secure communications protocol, such as TLS or SSL, to prevent eavesdropping, tampering, and message forgery. For example, a malicious third party may try to steal confidential data transmitted from the remote device to the RPA server or attempt to interfere with the operation of the remote devices and/or the RPA server by inserting bad data into the stream of data transmitted between the remote device and the RPA server.

According to some embodiments, after registering the remote device with the server, the RPA server 20 generates a set of encryption keys for the remote device 40, including a public key and a private key. According to other embodiments, the public and private encryption keys may be generated before the remote device is issued to an end user, and the manufacturer or distributor of the device may install the encryption keys in a persistent memory of the device before issuing the device to an end user. The private key provides secure communications between the remote device 40 and the RPA server 20. Data send to the remote device 40 can be encrypted by RPA server 20 using the public key associated with the remote device and the remote device 40 can decrypt the data using the private key issued to the device. Similarly, the remote device 40 may encrypt data transmitted to the RPA server 20 using the public key of the RPA server 20, and the RPA server 20 may decrypt the data using the RPA server's private key.

Figure 4:
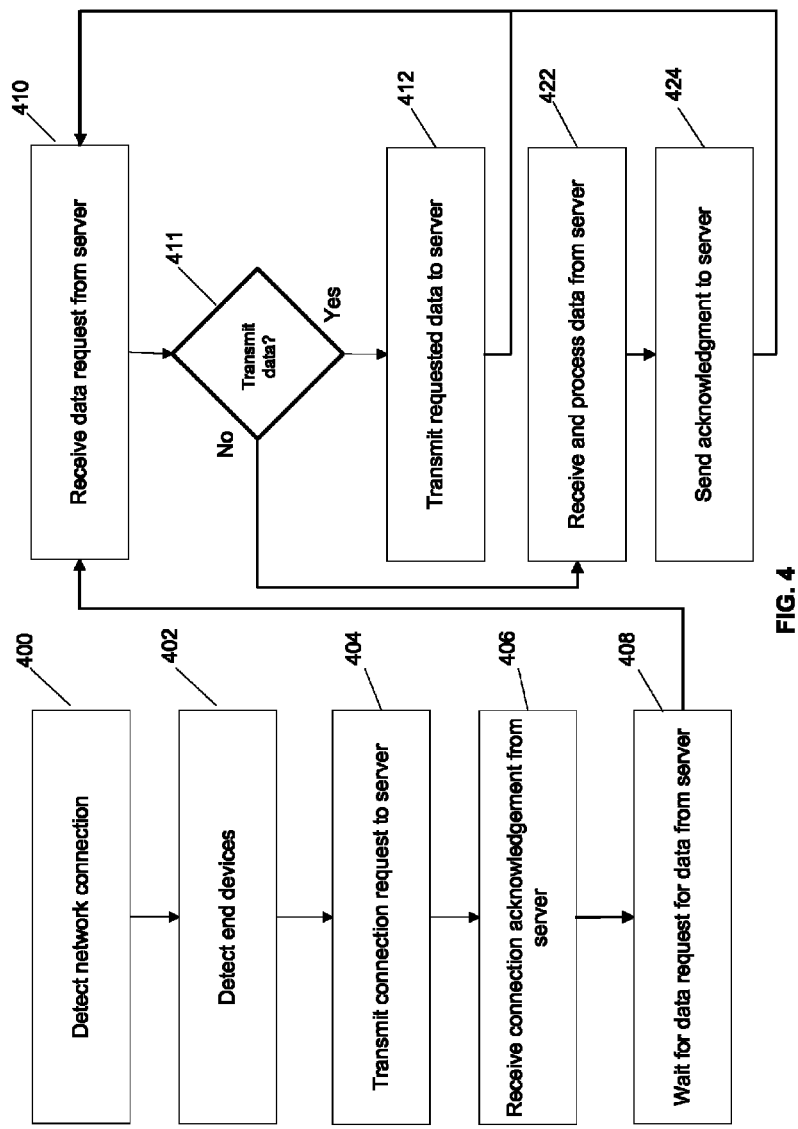
FIG. 4 is a high level flow diagram of a process for establishing a connection from a remote device to a remote port access server and responding to data requests from the RPA server according to an embodiment.

FIG. 4 is a high level flow diagram of a process for establishing a connection from a remote device to a remote port access server and responding to data requests from the RPA server according to an embodiment. The remote device 40 is configured to automatically send a connection request to the RPA server 20 on a predetermined port number when the remote device 40 is installed on local network 60. The remote device 40 first detects whether a network connection outside of the firewall of local network 60 is available (step 400). According to an embodiment, the remote device 40 pings the RPA server 20 to determine whether the RPA server 20 can be reached from the remote device 40.

The remote device 40 may also detect any end devices 65 coupled to ports of the remote device 65 (step 402). According to some embodiments, the end device 65 can be a sensor or any other kind of device which a client may wish to communicate. According to some embodiments, one or more end devices 65 maybe incorporated into the remote device 40. According to some embodiments, the detection of end devices can be performed before determining whether a network connection to the RPA server 20 is available.

After detecting that a network connection is available, the remote device 40 automatically sends a connection request to the RPA server 20 (step 404) in an attempt to establish a network connection with the RPA server 20 through the firewall of local network 60. According to an embodiment, the connection request includes the unique identifier of the remote device 40. According to some embodiments, the connection request includes the MAC address of the network interface card of the remote device 40.

The firewall of the local network 60 does not preclude devices on the local network from establishing a network connection with a device outside of the local network. The local network 60 on which the remote device is installed does not need to be modified to allow the RPA server 20 to communicate with the remote device 40, because the remote device 40 initiates the network connection to the RPA server 20 through the firewall, and the RPA server 20 then communicates with the remote device 40 using this network connection. Furthermore, because the remote device 40 initiates the connection with the RPA server 20 automatically, the remote device 40 does not need to be assigned a specific static IP address that is recognized by the RPA server 20. Rather, the RPA server 20 identifies the remote device 40 based on the unique device id and/or MAC address associated with the remote device.

The remote device 40 then receives a connection acknowledgment from the RPA server 20 (step 406). The RPA server looks up the unique identifier and/or the MAC address of the network interface card of the remote device 40 in a list of valid network devices and completes the connection with remote device 40 if the remote device is registered with the RPA server 20. Otherwise, the RPA server 20 ignores the connection request if the remote device 40 is not registered.

After establishing the connection with the RPA server 20, the remote device 40 waits for a data request from the RPA server 20 (step 408). The data request can be a request to transmit data from the remote device 40 or from an end device 65 coupled to a port of the remote device 40 to the RPA server 20. The data request can alternatively be a request to receive data from the RPA server 20. According to an embodiment, the data can be included with the request from the RPA server 20 or can be received as a separate transmission from the RPA server 20.

Once a connection has been established between the remote device 40 and the RPA server through the firewall 60, a client device 50 may connect to the RPA server 20 and send a data request from the remote device 40 to the RPA server 20, and the RPA server sends a data request to the remote device 40 across the connection between the RPA server 20 and the remote device 40 though the firewall 60. The remote device 40 receives the data request from the RPA server 20 (step 410), and a determination is made whether the data request was a request to transmit data or to receive data (step 411).

If the data request was a request to transmit data, and transmits the requested data to the RPA server 20 (step 412). The RPA server 20 then transmits the data to the client device 50. Once the remote device 40 transmits the requested data to the RPA server 20, the remote device 40 waits for another data request from RPA server 20 (step 408).

Otherwise, if the data request was a request to receive data, the remote device 40 receives and processes the data from the RPA server 20 (step 422). According to some embodiments, the data to be received and processed by the remote device 40 may be included with the data request received by the remote device 40, while in other embodiments, the data to be received and processed by the remote device 40 may be sent separately from the data request by the RPA server 20. According to some embodiments, the remote device 40 sends an acknowledgement to the RPA server 40 after receiving the data.

According to some embodiments, the remote device 40 can automatically transmit data to the RPA server 20 periodically. For example, the remote device 40 may be configured to collect sensor data from one or more end devices 65 and to periodically send the data to the RPA server 20. According to an embodiment, the RPA server 20 may be configured to store the data until the data is retrieved by a client device 50. In yet other embodiments, the RPA server 20 may be configured to transmit the data received from the remote device 40 to a client device 50 upon receipt of the data from the remote device 40.

Figure 5:
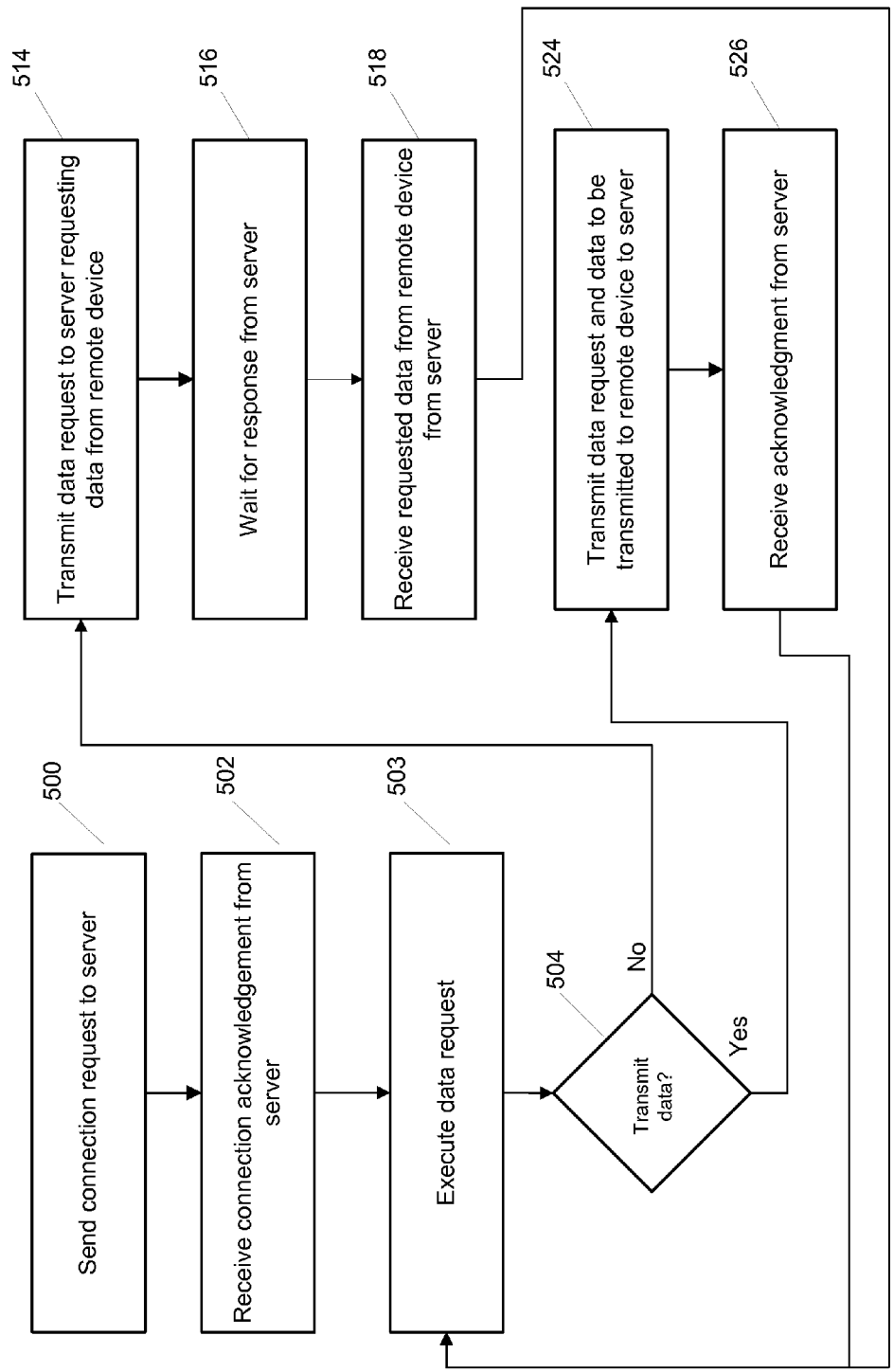
FIG. 5 is a high level flow diagram of a process for communicating with a remote port access server from a client device according to an embodiment.

FIG. 5 is a high level flow diagram of a process for establishing a connection from a client device to a remote port access server and for requesting data from a remote device through the RPA server according to an embodiment. The client device 50 sends a connection request to the RPA server 20 to establish a network connection (step 500) on a predetermined port number. According to an embodiment, the remote devices 40 and the client devices 50 connect to different port numbers on the RPA server 20. According to some embodiments, communications between the client device 50 and the RPA server 20 are encrypted as described above.

If the client device is registered with the RPA server 20, the RPA server 20 sends a connection acknowledgment to the client device 50. The client device receives the connection acknowledgment from the RPA server 20 (step 502). According to some embodiments, the RPA server requires that the client be authenticated before the RPA server 20 will establish the connection with the client. For example, the RPA server 20 can require a username and password from the client in order to verify that the request to connect from the client device 50 has been provided by an authorized person. In one embodiment, the client device 50 may request a username and password from a user at the client device 50, and the client device 50 includes the username and password in the connection request. In another embodiment, the RPA server 20 may provide a user interface, such as a web page, to the client device 50 in response to the connection request. The user interface provides inputs to enter the username and password of the client. If the username and password provided are correct, the RPA server 20 establishes the connection with the client device 50. Otherwise, if an incorrect username and password combination are entered, the RPA server 20 does not establish the connection with the client device 50 and may send a message to the client device 50 or display a web page indicating that the username and password combination entered did not match those maintained by the RPA server 20.

After receiving the connection acknowledgment from the RPA server 20, the client device may execute a data request (step 503). A data request can include requesting data from one or more remote devices 40 via the RPA server 20 or transmitting data to one or more remote device 40 via RPA server 20. According to some embodiments, the data request may be trigged automatically, such as by a scheduled event on the client device 50, or according to some embodiments, a data request may be triggered by a manual action performed by a user of the client device 50. A client device can be configured to periodically request data from remote devices. For example, a client may own several filling stations or provide fuel filling stations and place sensor that monitor the fuel levels in the fuel storage tanks at the filling stations.

If the data request is a request to receive data from one or more remote devices 40, the client device 50 sends a request for data from one or more remote devices 40 to RPA server 20 (step 514). The client device 50 then waits for a response from the RPA server 20 (step 516) while the RPA server 20 retrieves the requested data from the one or more remote devices 40. The client device 50 then receives the requested data from the RPA server 20 (step 518). The method then returns to step 503 where a next data request may be executed by the client device (step 503).

If the data request is a request to transmit data to one or more remote device 40, the client device 50 transmits a data request and the data to be transmitted to the one or more remote devices 40 to RPA server 20 (step 524). The data request identifies the client from which the data is being transmitted and identifies which remote devices 40 should receive the data. According to some embodiments, the client device 50 may transmit the data request and the data in separate transmissions to the RPA server 20. According to some embodiments, the client device 50 may receive an acknowledgment from the RPA server 20 indicating that the data request and the data have been received by the RPA server 20 (step 524). The method then returns to step 503 where a next data request may be executed by the client device (step 503).

Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in computer or controller accessible on readable media including RAM memory, flash memory, ROM memory, EPROM memory, EEPROM memory, registers, hard disk, a removable disk, a CD-ROM, or any other form of computer-readable storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A method for use at a remote port access (RPA) server to provide access to data from an end device, the method comprising:

receiving a first connection request at the RPA server from a remote device, the first connection request received at a first predetermined port number, the remote device being located behind a firewall configured to allow outbound connections from the remote device and block inbound connections to the remote device, and the remote device being coupled to the end device;

in response to the first connection request, determining whether the remote device is associated with a client;

establishing a first network connection between the RPA server and the remote device through the firewall when the remote device is associated with the client;

receiving a second connection request at the RPA server from a client device, the second connection request received at a second predetermined port number, the client device being located outside the firewall and associated with the client;

establishing, in response to the second connection request, a second network connection between the RPA server and the client device;

receiving a request from the client device for data from the end device coupled to the remote device, the request received at the RPA server via the second network connection;

in response to the request for data, determining whether the remote device is associated with the client;

requesting data by the RPA server from the end device via the remote device and the first network connection when the remote device is associated with the client;

receiving the requested data at the RPA server from the remote device via the first network connection; and providing the requested data from the RPA server to the client device via the second network connection.

2. The method of claim 1, further comprising:
listening for connection requests from the remote device at the first predetermined port number.

3. The method of claim 1, further comprising:
listening for connection requests from the client device at the second predetermined port number.

4. The method of claim 1 wherein the remote device is assigned a unique identifier at the time the device is manufactured, and wherein the first connection request received from the remote device includes the unique identifier assigned to the remote device.

5. The method of claim 4, further comprising:
comparing the unique identifier for the remote device received in the first connection request to a set of remote devices associated with a client; and
adding the unique identifier for the remote device a list of connected but unassigned remote devices if the unique identifier for the remote device is not included in the set of remote devices associated with a client.

6. The method of claim 4, wherein the first network connection is only established if the unique identifier was previously registered with the RPA server.

7. The method of claim 1 wherein the remote device is configured to automatically generate the first connection request in response to detecting network connectivity, wherein the first network connection is a Transport Control Protocol (TCP) connection through the firewall.

8. The method of claim 1, further comprising:
receiving data automatically transmitted from the remote device;
storing the data received from the remote device; and
transmitting the stored data to the client device.

9. The method of claim 8, wherein the data automatically transmitted from the remote device is data from the end device.

10. The method of claim 1, further comprising:
adding an identifier, corresponding to the remote device, to an unassigned-device listing when the remote device is not associated with a client; and
in further response to the request for data, providing the unassigned-device listing to the client device through a registration interface when the remote device is not associated with the first client.

11. A system comprising:
a remote device;
a client device; and
a remote port access server communicatively coupled to the remote device and the client device, and configured to
listen for connection requests from the remote device on a first set of predetermined ports and determine whether the remote device is associated with a client, the remote device being located behind a firewall configured to allow outbound connections from the remote device and block inbound connections to the remote device, and the remote device being coupled to an end device;
establish a first network connection with the remote device through the firewall in response to a connection request from the remote device when the remote device is associated with the client;
listen for connection requests from the client device on a second set of predetermined ports and determine whether the remote device is associated with the client, the client device being located outside of the firewall and associated with the client;
establish a second network connection with the client device in response to receiving a connection request from the client device;
receive a data request from the client device for data from the end device;
request from the end device, via the remote device, the data requested in the data request when the remote device is associated with the client;
receive the requested data from the remote device; and
transmit the requested data received from the remote device to the client.

12. The system of claim 11 wherein the remote device is assigned a unique identifier at the time the device is manufactured, and wherein the connection request received from the remote device includes the unique identifier assigned to the remote device.

13. The system of claim 12 wherein the remote port access server is further configured to:
compare the unique identifier for the remote device received in the connection request to a set of remote devices associated with a client; and
add the unique identifier for the remote device a list of connected but unassigned remote devices if the unique identifier for the remote device is not included in the set of remote devices associated with a client.

14. The system of claim 11 wherein the first network connection is Transport Control Protocol (TCP) connection through the firewall.

15. The system of claim 11 wherein the remote device is configured to automatically generate the connection request in response to detecting network connectivity.

16. A non-transitory computer-readable medium comprising processor-executable instructions that, when executed, direct a computer system to perform actions comprising:
receiving a first connection request from the remote device, the connection request from the remote device received at a first predetermined port number, the remote device being located behind a firewall configured to allow outbound connections from the remote device and block inbound connections to the remote device, and the remote device being coupled to the end device;
in response to the first connection request, determining whether the remote device is associated with a client;
establishing a first network connection with the remote device through the firewall when the remote device is associated with the client;
receiving, in response to the first connection request, a second connection request from a client device, the connection request from the client device received at a second predetermined port number, the client device being located outside the firewall and associated with the client;
establishing, in response to the second connection request, a second network connection with the client device;
receiving a request from the client device for data from the end device coupled to the remote device, the request received at the RPA server through the second network connection;
in response to the request for data, determining whether the remote device is associated with the client;
requesting data from the end device via the remote device and the first network connection when the remote device is associated with the client;
receiving the requested data from the remote device via the first network connection; and
providing the requested data to the client device via the second network connection.

17. The non-transitory computer readable medium of claim 16, further comprising instructions that, when executed, direct the computer system to perform actions comprising:
listening for connection requests from the remote device at the first predetermined port number.

18. The non-transitory computer readable medium of claim 16, further comprising instructions that, when executed, direct the computer system to perform actions comprising:
listening for connection requests from the client device at the second predetermined port number.

19. The non-transitory computer readable medium of claim 16 wherein the remote device is assigned a unique identifier at the time the device is manufactured, and wherein the first connection request received from the remote device includes the unique identifier assigned to the remote device.

20. The non-transitory computer readable medium of claim 19, further comprising instructions that, when executed, direct the computer system to perform actions comprising:
comparing the unique identifier for the remote device received in the first connection request to a set of remote devices associated with a client; and
adding the unique identifier for the remote device a list of connected but unassigned remote devices if the unique identifier for the remote device is not included in the set of remote devices associated with a client.

21. The non-transitory computer readable medium of claim 16 wherein the first network connection is Transport Control Protocol (TCP) connection through the firewall.

22. The non-transitory computer readable medium of claim 16 wherein the remote device is configured to automatically generate the connection request in response to detecting network connectivity.

* * * * *